(12) United States Patent
Trewiler et al.

(10) Patent No.: US 7,126,079 B2
(45) Date of Patent: Oct. 24, 2006

(54) METHOD FOR REPAIRING A HOLE IN A METALLIC WORKPIECE

(75) Inventors: Gary Edward Trewiler, Loveland, OH (US); John Michael Muldoon, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 194 days.

(21) Appl. No.: 10/982,274

(22) Filed: Nov. 5, 2004

(65) Prior Publication Data

US 2006/0096955 A1    May 11, 2006

(51) Int. Cl.
*B23K 11/00* (2006.01)
(52) U.S. Cl. .................... 219/117.1; 228/119
(58) Field of Classification Search ............. 219/117.1; 228/119
See application file for complete search history.

(56) References Cited

U.S. PATENT DOCUMENTS

| | | | |
|---|---|---|---|
| 1,568,080 A | 1/1926 | Meadowcroft | |
| 2,599,045 A | 6/1952 | Brolaski | |
| 2,620,424 A | 12/1952 | Otto | |
| 2,790,891 A | 4/1957 | Welsh | |
| 4,182,951 A | 1/1980 | Kuder | |
| 6,281,467 B1 | 8/2001 | Gould et al. | |
| 6,545,244 B1 | 4/2003 | Gould et al. | |

FOREIGN PATENT DOCUMENTS

GB    2 000 710    *    1/1979

* cited by examiner

*Primary Examiner*—Len Tran
(74) *Attorney, Agent, or Firm*—McNees Wallace & Nurick LLC

(57) ABSTRACT

A workpiece structure having a hole therein is repaired by preparing a stack having a first confinement sheet, a first donor sheet, a workpiece structure having a hole therein, a plug of a plug material in the hole, optionally a second donor sheet, and a second confinement sheet. The first confinement sheet, the first donor sheet, the second donor sheet, and the second confinement sheet each overlie the hole. The first confinement sheet and the second confinement sheet each melt at a temperature greater than do the first donor sheet, the plug, and the second donor sheet. The stack is locally heated at the hole using an electrical current source to a temperature sufficiently high to locally melt the first donor sheet, the plug, the second donor sheet, and the workpiece structure. The stack is thereafter cooled to solidify all melted material and form a weldment.

17 Claims, 3 Drawing Sheets

METHOD FOR REPAIRING A HOLE IN A METALLIC WORKPIECE

This invention relates to repair procedures, and more particularly, to repairing a hole in a metallic workpiece by welding.

BACKGROUND OF THE INVENTION

An undesired hole may be formed in a metallic article during fabrication or service. Such an undesired hole is most common in relatively thin sheets of the metallic material. For example, during fabrication a hole may be unintentionally punched in a sheet structure or produced by a joining process. During service, holes may result from environmental causes such as burning or impacts of rocks or the like. Holes may also result from hostile penetrations from sources such as a bullet or other projectile. Existing holes also may become oversized or otherwise damaged due to wear, corrosion, or other in-service conditions.

In many cases, the extent of damage associated with the hole is not too great, and the hole may be repaired. In one common approach, the hole is patched with a sheet of a material attached, as by welding, overlying the hole. This patch thickens the sheet and alters its aerodynamic properties, and also results in reduced strength in the neighborhood of the hole and leaves a stress concentration having an increased propensity for premature failure.

In another approach, the hole is welded shut, as for example by gas tungsten arc welding of a hole in an aluminum alloy. Weld repair can lead to significant distortion of the shape and dimensions of the article, particularly for thin sheets. Various types of support fixtures and chill blocks are used to reduce the distortion, but such tooling significantly increases the cost of the repair. Additionally, the quality of the weldments in thin workpieces is suspect, so that the strength of the welded structure is compromised. Most materials shrink when they solidify, leaving porosity in the weldment. Gas bubbles in the weldment also produce porosity. The porosity reduces the mechanical properties of the weldment and thence of the welded structure. Another important disadvantage is that the quality of conventional weldments is highly dependent upon the skill of the welder or the setup of an automatic welding machine, so that there may be inconsistency from weld to weld.

There is a need for an improved approach to the repair of holes in metallic articles, particularly thin sheet articles. The present invention fulfills this need, and further provides related advantages.

SUMMARY OF THE INVENTION

The present invention provides a method for repairing a hole in a workpiece that realizes the benefits of using tooling plates, but also produces improved weld quality by providing a reservoir of additional filler metal as well as an excess volume outside of the final weldment for receiving and accumulating porosity. The excess volume is removed after solidification of the weldment.

A method for repairing a workpiece structure comprises first preparing a stack comprising, in order, a first confinement sheet, a first donor sheet, wherein the first donor sheet has a melting point less than a melting point of the first confinement sheet, and a workpiece structure having a hole therein. The workpiece structure may be planar or nonplanar, and the hole may be a through-hole or a non-through-hole such as a blind hole or a pit. The workpiece structure has a melting point less than a melting point of the first confinement sheet, and the hole is overlaid by the first confinement sheet and the first donor sheet. The stack further includes a plug of a plug material in the hole, wherein the plug material has a melting point less than the melting point of the first confinement sheet. The stack is locally heated at the hole using an electrical current source to a temperature sufficiently high to locally melt the first donor sheet and the plug material, and preferably the workpiece structure adjacent to the hole, but not the first confinement sheet. The electrical current source is preferably a pair of electrodes pressed against opposite sides of the stack, often with a backing plate disposed between each respective electrode and the confinement sheet. Thereafter, the stack is cooled to solidify all melted material and form a weldment. Typically, excess material is removed from the weldment.

Any operable materials may be used. Preferably, the first donor sheet, the plug, and the workpiece structure are metallic and are the same metal or the same alloy. In a case of interest, the first donor sheet, the plug, and the workpiece structure are aluminum-base alloys, preferably the same aluminum-base alloy.

The stack may further include a symmetrically placed donor sheet and confinement sheet on the other side of the workpiece structure, so that the final weldment is symmetrical in the through-thickness direction relative to the workpiece structure. In this case, the stack comprises, in order, the first confinement sheet, the first donor sheet, wherein the first donor sheet has a melting point less than the first confinement sheet, the workpiece structure having the hole therein, wherein the workpiece structure has a melting point less than the confinement sheet, the plug of plug material in the hole, a second donor sheet, wherein the second donor sheet has a melting point less than the first confinement sheet, and a second confinement sheet, wherein the second confinement sheet has a melting point greater than the first donor sheet, the workpiece structure, and the second donor sheet. The first confinement sheet, the first donor sheet, the second donor sheet, and the second confinement sheet each overlie the hole. In the step of locally heating, the stack at the hole is locally heated to a temperature sufficiently high to melt the first donor sheet, the plug, and the second donor sheet, but not the first confinement sheet and the second confinement sheet.

Thus, in a preferred approach, a method for repairing a workpiece structure comprises preparing a stack comprising, in order, a first confinement sheet, a first donor sheet, a workpiece structure having a hole therein, a plug of a plug material in the hole, a second donor sheet, and a second confinement sheet. The first confinement sheet, the first donor sheet, the second donor sheet, and the second confinement sheet each overlie the hole. The first confinement sheet and the second confinement sheet each melt at a temperature greater than do the first donor sheet, the plug, and the second donor sheet. The stack at the hole is thereafter heated using an electrical current source to a temperature sufficiently high to locally melt the first donor sheet, the plug, the second donor sheet, and the workpiece structure adjacent to the hole (but not generally). The stack is thereafter cooled to solidify any melted material and form a weldment. Other compatible features discussed herein may be used with this embodiment.

The present approach provides a convenient, well-controlled technique for repairing the hole in the workpiece structure. The confinement sheets hold the workpiece structure flat or in an other predetermined shape during and after the welding process, preventing distortion of the workpiece structure. The confinement sheets also have electrical resistance, adding to the heat available for welding by their resistance to the electrical current flow. Consequently, larger amounts of weld repair may be performed on the workpiece structure than possible with conventional techniques such as gas tungsten arc welding. The filler metal is provided by the donor sheet(s). The geometry of the donor sheet ensures that the weldment is initially oversize slightly, so that there is excess weldment material to be removed. In many cases, defects such as porosity are removed with the excess weldment material. The oversize weldment also ensures that a desirable microstructure will extend throughout the entire weldment after removal of the excess weldment material, increasing the relative strength of the weldment as compared with the base metal of the workpiece structure. The present approach is highly consistent and not dependent upon the skill of the welder.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
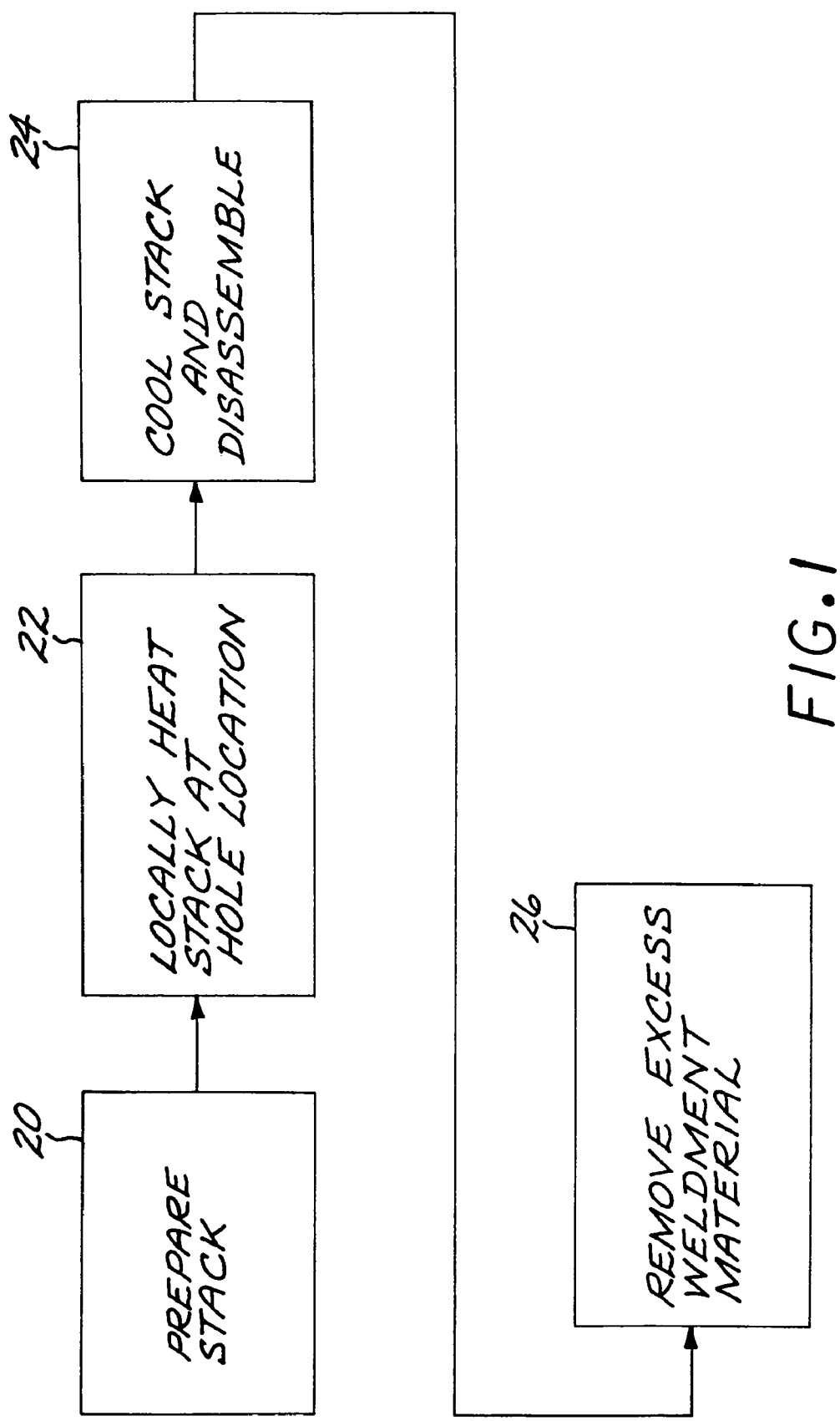
FIG. 1 is a block diagram of a preferred method for practicing an embodiment of the invention.
Figure 2:
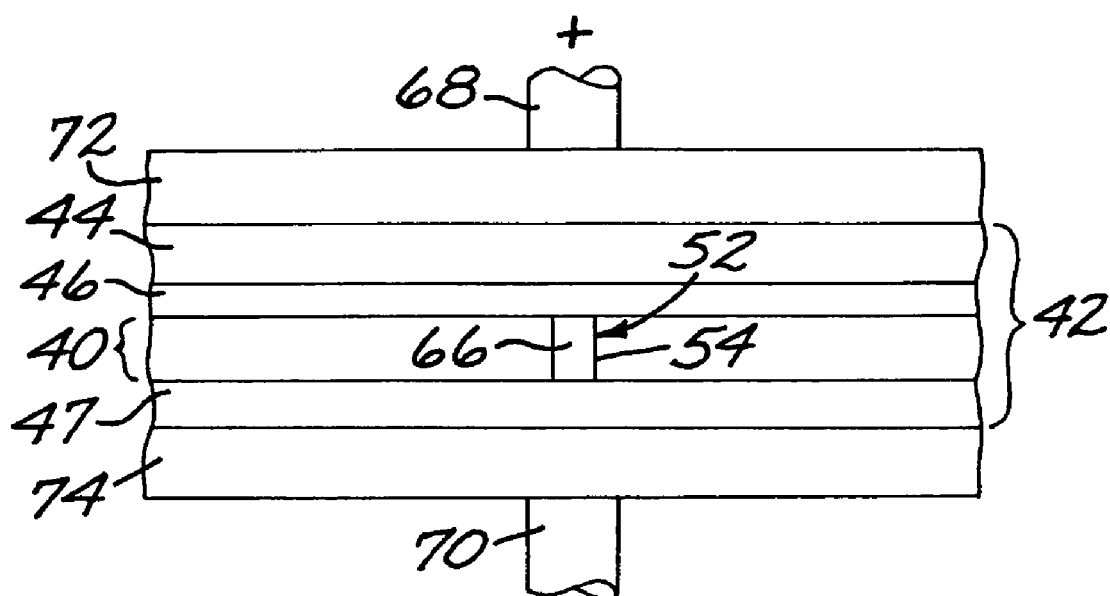
FIG. 2 is a schematic elevational view of a single-sided stack applied to hole filling, prior to heating.

FIG. 1 depicts a method for welding a workpiece structure 40. FIGS. 2–4 and 5–7 illustrate the structures associated with some embodiments of the method. Referring to FIGS. 1 and 2, the method includes first preparing, step 20, a stack 42 comprising, in order, a first confinement sheet 44, a first donor sheet 46, and the workpiece structure 40 having a hole 52 therein. The first donor sheet 46 lies between the first confinement sheet 44 and the workpiece structure 40. The first confinement sheet 44 and the first donor sheet 46 are on the same side of the workpiece structure 40. There is additionally a second confinement sheet 47 on the opposite side of the workpiece structure 40 from the first confinement sheet 44, so that the workpiece structure 40 lies between the second confinement sheet 47 and the first donor sheet 46. This is a "one-sided" configuration wherein there is just one donor sheet, the first donor sheet 46.

In the embodiments of FIGS. 2–4 and 5–7, the workpiece structure 40 is a single workpiece sheet 50 having the hole 52 therethrough with a hole periphery 54. A plug 66 that initially fills the hole 52 is part of the stack 42.

Figure 5:
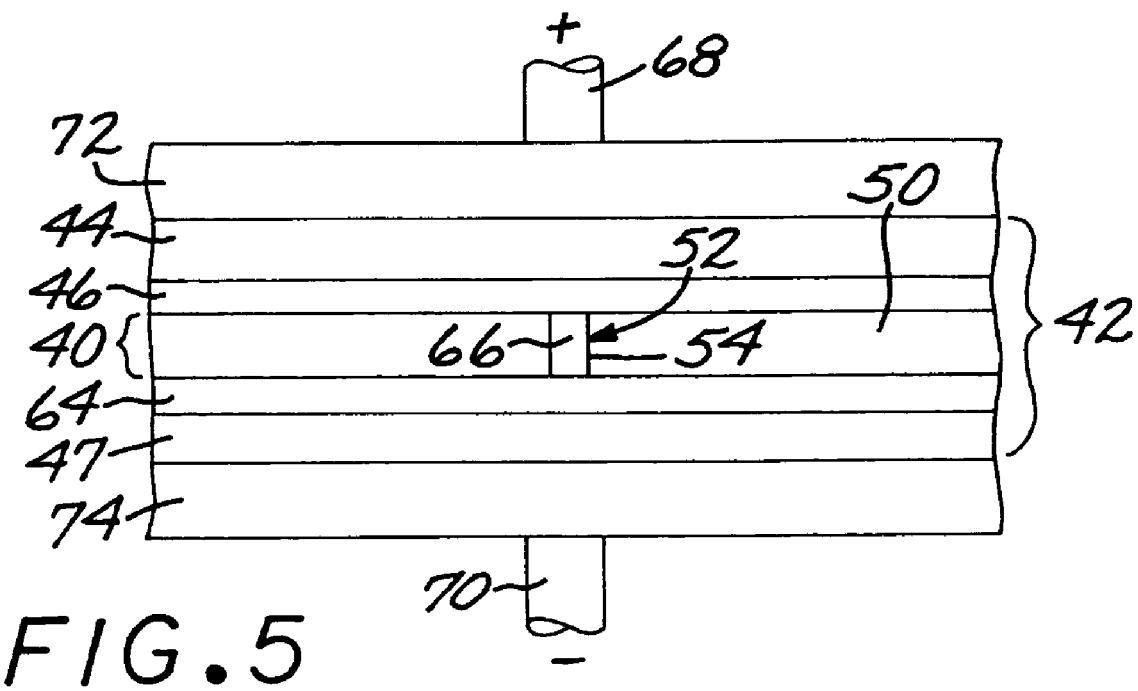
FIG. 5 is a schematic elevational view of a double-sided stack applied to hole filling, prior to heating.
Figure 6:
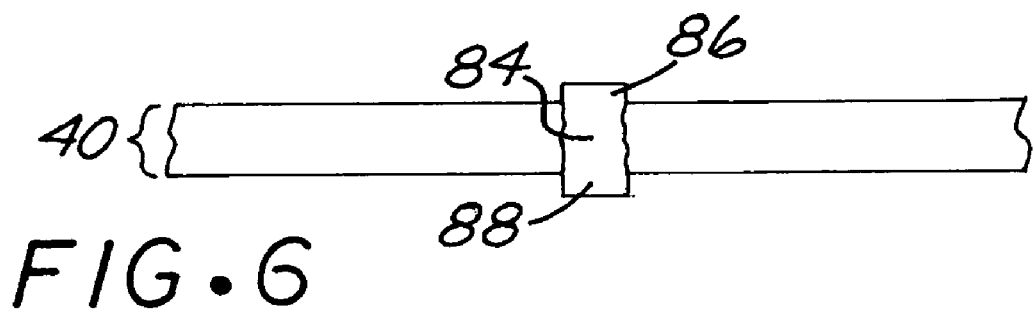
FIG. 6 is a schematic elevational view of the double-sided stack of FIG. 5, after heating and cooling and stack disassembly, and prior to removal of the excess weldment material.
Figure 7:
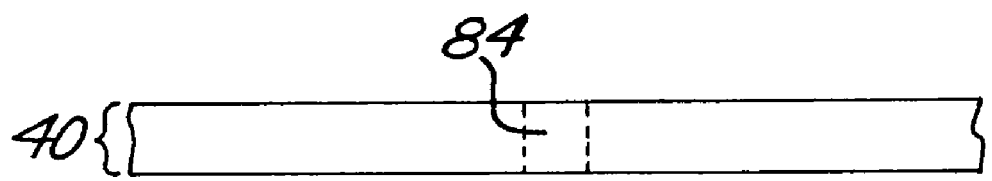
FIG. 7 is a schematic elevational view of the double-sided stack of FIG. 6, after removal of the excess weldment material.

The embodiments of FIGS. 5–7 are "two-sided" configurations wherein there is, in addition to the elements 40, 44, 46, and 47, a second donor sheet 64 lying between the workpiece structure 40 and the second confinement sheet 47. The differing results obtained using the "one-sided" and "two-sided" configurations will be discussed subsequently.

In all cases, the confinement sheets 44 and 47 and the donor sheets 46 and 64 (where present) overlie the hole 52. That is, the confinement sheets 44 and 47 and the donor sheets 46 and 64 (where present) are in registry over the hole 52 and extend laterally some distance beyond the hole periphery 54.

The workpiece structure 40 may be made out of any operable materials. A typical material of the workpiece structure 40 is an aluminum alloy such as alloy 6061. The donor sheets 46 and 64, and the plug 66, may be any operable material, but are typically chosen to be the same material as the workpiece structure 40. The confinement sheets 44 and 47 are made of a material with a melting point greater than the melting points of the donor sheets 46 and 64 (where present), of the melting point of the plug 66, and of the melting point of the workpiece structure 40. The confinement sheets 44 and 47 prevent the loss of material to the outside from the donor sheets 46 and 64, from the plug 66, and from the workpiece structure 40 during subsequent melting.

The stack 42 is locally heated, step 22 of FIG. 1, at the location of the hole 52 to a welding temperature sufficiently high to locally melt the first donor sheet 46 and the second donor sheet 64 (where present), and the plug 66. The welding temperature is preferably sufficiently high to melt the portions of the workpiece structure 40 that are immediately adjacent to the hole periphery 54. The welding temperature is not sufficiently high to melt the first confinement sheet 44 and the second confinement sheet 47. The two confinement sheets 44 and 47 serve to confine the melted material of the donor sheets 46 and 64, the plug 66, and the workpiece structure 40 while they are molten.

The heating step 22 is controlled so that the donor sheets 46 and 64, the plug 66, and the workpiece structure 40 are melted only locally and not generally. That is, they are preferably melted over a distance of not more than about one-half of the thickness of the workpiece structure 40 laterally outwardly from the hole periphery 54, although this distance of melting may be smaller or larger, depending upon the exact circumstances.

The heating step 22 may be accomplished by any operable local heating technique. Preferably, the heat energy is supplied by resistance electrodes 68 and 70 that contact optional respective backing plates 72 and 74 that are placed in-line with the stack 42 contacting the outward faces of the respective confinement sheets 44 and 47. The resistance electrodes 68 and 70 may be, for example, the preferred stationary electrode pieces or rolling electrodes if the hole is elongated perpendicular to the plane of the illustrations of FIGS. 2–4 and 5–7.

During the heating step 22, the melted portions fuse together and intermix. In the hole repair of FIGS. 2–4 and 5–7, the plug 66 melts and mixes with the melted material of the donor sheets 46 and 64 (if present) and the adjacent portions of the workpiece structure 40.

The stack 42 is thereafter cooled to solidify all melted material and form a solid weldment 84 that fills what was previously the hole 52, step 24. The weldment 84 extends through the workpiece structure 40 and also outwardly from the faces of the workpiece structure 40. The weldment 84 may extend outwardly on one side of the workpiece structure 40, as in the embodiment of FIG. 3 where there was a single donor sheet 46, or on both sides of the workpiece structure 40, as in the embodiment of FIG. 6, where there were two donor sheets 46 and 64. The cooling may be performed in a manner so as to control the solidification of the weldment 84 if desired, but typically the cooling and solidification of the molten volume occurs very rapidly, on the order of one second or less. Cooling may be accelerated by flooding the stack 42 with water or other coolant at the conclusion of step 22.

Figure 3:
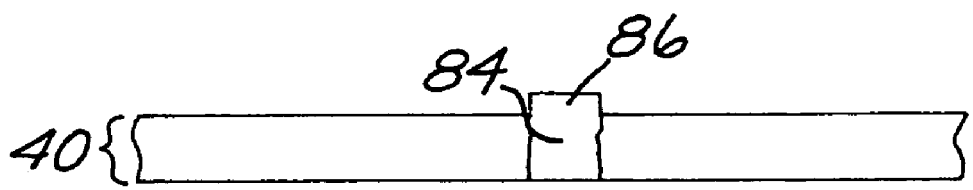
FIG. 3 is a schematic elevational view of the workpiece structure portion of FIG. 2, after heating and cooling and stack disassembly, and prior to removal of the excess weldment material.

After cooling, the stack 42 is disassembled and the non-welded portions are removed. That is, the backing plates 72 and 74, the confinement sheets 44 and 47, and the unmelted portions of the donor sheets 46 and 64 are separated. The result is structures such as shown in FIGS. 3 and 6.

Figure 4:
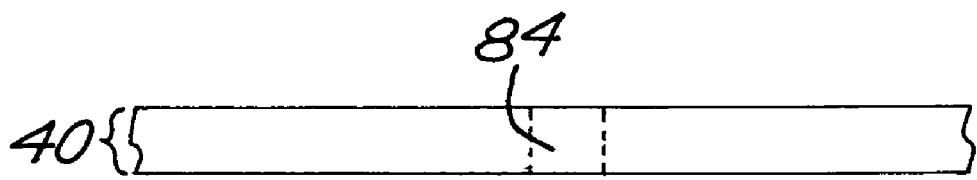
FIG. 4 is a schematic elevational view of the workpiece structure portion of FIG. 3, after removal of the excess weldment material.

The excess portions 86 and 88 (if present) of the weldment 84 that extend laterally outwardly from the workpiece structure 40 are then preferably removed, step 26, producing the finished welded structures shown in FIGS. 4 and 7. The removal step 26 may be accomplished by any operable approach, such as grinding or machining.

Although the processing that utilizes the removal step 26 adds to the cost of the welded structure, the weldment 84 in the final welded structure is more sound and controlled than in the absence of the donor sheets 46 and 64. During step 22, the melted material from the donor sheets 46 and 64 flows into and ensures filling of the volume at and adjacent to the hole 52. If the donor sheets 46 and 64 were not present, there could be voids in, and irregular surfaces of, the weldment 84, which would reduce its strength. The present approach of producing an oversize weldment and removing the excess material minimizes such voids and irregular surfaces of the weldment 84, and also allows porosity to migrate into the excess portions 86 and 88 for subsequent removal.

In one preferred embodiment, the workpiece structure 40, the donor sheets 46 and 64, and the plug 66, where present, are made of an aluminum-base alloy such as alloy 6061 (although other aluminum alloys and non-aluminum alloys may be used as well). The confinement sheets 44 and 47 are made of stainless steel or a high-temperature alloy such as a nickel-base alloy. The backing plates 72 and 74 are made of a low-carbon steel or a tool steel. In an exemplary situation, the workpiece structure 40 is from about 0.04 inch to about 0.50 inch thick, the donor sheets 46 and 64 are each about 0.010 inch to about 0.125 inch thick, the confinement sheets 44 and 47 are each about 0.5 inch maximum thickness, and the backing plates 72 and 74 are each about 0.5 inch maximum thickness.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for repairing a workpiece structure, comprising the steps of
preparing a stack comprising, in order,
a first confinement sheet,
a first donor sheet, wherein the first donor sheet has a melting point less than a melting point of the first confinement sheet, and
a workpiece structure having a hole therein, wherein the workpiece structure has a melting point less than a melting point of the first confinement sheet, and wherein the hole is overlaid by the first confinement sheet and the first donor sheet,
a plug of a plug material in the hole, wherein the plug material has a melting point less than the melting point of the first confinement sheet, thereafter
locally heating the stack at the hole using an electrical current source to a temperature sufficiently high to locally melt the first donor sheet and the plug material but not the first confinement sheet; and thereafter
cooling the stack to solidify all melted material and form a weldment.

2. The method of claim 1, wherein the step of preparing a stack includes the step of
providing a planar workpiece structure.

3. The method of claim 1, wherein the step of preparing includes the step of
providing the first donor sheet, the plug, and the workpiece structure as aluminum alloys.

4. The method of claim 1, wherein the step of preparing includes the step of
providing the first donor sheet, the plug, and the workpiece structure as the same aluminum alloy.

5. The method of claim 1, wherein the step of preparing includes the step of
providing the first donor sheet, the plug, and the workpiece structure as the same alloy.

6. The method of claim 1, wherein the step of preparing includes the step of
providing the workpiece structure having a thickness of from about 0.04 inch to about 0.50 inch.

7. The method of claim 1, wherein the step of locally heating includes the step of
locally heating the stack at the hole to a temperature sufficiently high to locally melt the workpiece structure but not the first confinement sheet.

8. The method of claim 1, wherein the step of locally heating includes the step of
placing an electrode on each side of the stack so that the hole lies between the electrodes.

9. The method of claim 1, including an additional step, after the step of cooling, of
removing excess material from the weldment.

10. The method of claim 1, wherein the step of preparing includes the step of
preparing the stack comprising, in order,
the first confinement sheet,
the first donor sheet, wherein the first donor sheet has a melting point less than the first confinement sheet,
the workpiece structure having the hole therein, wherein the workpiece structure has a melting point less than the confinement sheet,
the plug of plug material in the hole,
a second donor sheet, wherein the second donor sheet has a melting point less than the first confinement sheet, and
a second confinement sheet, wherein the second confinement sheet has a melting point greater than the first donor sheet, the workpiece structure, and the second donor sheet, wherein the first confinement sheet, the first donor sheet, the second donor sheet, and the second confinement sheet each overlie the hole, and wherein the step of locally heating includes the step of locally heating the stack at the hole to a temperature sufficiently high to melt the first donor sheet, the plug, and the second donor sheet, but not the first confinement sheet and the second confinement sheet.

11. A method for repairing a workpiece structure, comprising the steps of preparing a stack comprising, in order,
a first confinement sheet,
a first donor sheet,
a workpiece structure having a hole therein,
a plug of a plug material in the hole,
a second donor sheet, and
a second confinement sheet,
wherein the first confinement sheet, the first donor sheet, the second donor sheet, and the second confinement sheet each overlie the hole, and wherein the first confinement sheet and the second confinement sheet each melt at a temperature greater than do the first donor sheet, the plug, and the second donor sheet; thereafter
locally heating the stack at the hole using an electrical current source to a temperature sufficiently high to locally melt the first donor sheet, the plug, the second donor sheet, and the workpiece structure; and thereafter
cooling the stack to solidify any melted material and form a weldment.

12. The method of claim 11, wherein the step of preparing a stack includes the step of
providing a planar workpiece structure.

13. The method of claim 11, wherein the step of preparing includes the step of
providing the first donor sheet, the plug, and the workpiece structure as the same aluminum alloy.

14. The method of claim 11, wherein the step of preparing includes the step of
providing the first donor sheet, the plug, and the workpiece structure as the same alloy.

15. The method of claim 11, wherein the step of preparing includes the step of
providing the workpiece structure having a thickness of from about 0.04 inch to about 0.50 inch.

16. The method of claim 11, including an additional step, after the step of cooling, of
removing excess material from the weldment.

17. The method of claim 11, wherein the step of locally heating includes the step of
placing an electrode on each side of the stack so that the hole lies between the electrodes.

* * * * *